Dec. 5, 1933.  B. KWARTIN  1,938,184

REGENERATIVE PHOTO ELECTRIC CELL

Filed April 24, 1929

Inventor
BERNARD KWARTIN
By Leon Edelson
Attorney

Patented Dec. 5, 1933

1,938,184

UNITED STATES PATENT OFFICE 1,938,184

REGENERATIVE PHOTO-ELECTRIC CELL

Bernard Kwartin, Philadelphia, Pa.

Application April 24, 1929. Serial No. 357,642

3 Claims. (Cl. 250—41.5)

This invention relates to devices for changing light variations into electrical variations and more particularly to improvements in photo-electric cells and circuits associated therewith.

As was pointed out in my copending application, Serial No. 237,323, filed December 2, 1927, photo-electric cells, as now used for converting light energy into electrical energy, are subject to a number of disadvantages, the most important of which is that such cells do not of themselves have the property of amplifying the electrical energy to the necessary value often found desirable. This is especially noticeable where it becomes desirable to translate very weak light variations into electrical variations of sufficient strength to operate electrically responsive devices. Accordingly, one of the primary objects of this invention is the provision of a device which includes as an element thereof an ordinary photo-electric cell for converting light variations into electrical variations, in combination with additional means actuated by said electrical variations and operable to subject said photo-electric cell to the action of further light whereby to produce a final flow of current which is of greater strength than that obtainable solely from the photo-electric cell.

A still further object of the invention is the provision of a regenerative amplifier including as one element thereof a photo-electric cell together with means energized by the flow of current produced by the action of said photo-electric cell when subjected to variations of light, the operation of the amplifier being such that the resistance of the photo-electric cell is reduced to an irreducible minimum with the consequence that a flow of current of maximum value is thus produced.

A still further object of the invention is the provision of a regenerative photo-electric cell circuit by means of which light variations of given intensities may be converted into electrical variations of magnitudes greater than has been heretofore possible by the sole use of an ordinary photo-electric cell, the amplified current being to all intents and purposes an exact magnified image of the current as originally set up by the action of the light variations upon the photo-electric cell utilized in the regenerative circuit.

A still further object of the invention is the provision of a regenerative type of circuit wherein light variations are initially converted into electrical variations by a photo-electrical cell, the circuit including means operative to increase the sensitiveness of the cell in accordance with the original light variations whereby to greatly amplify the electrical variations initially set up in the photo-electric cell circuit.

Other objects and objects relating to details of operation and construction of the invention will appear more fully hereinafter.

The invention consists substantially in the combination, construction, assembly and relative arrangement of parts all as will be more fully described hereinafter, as shown in the accompanying drawing, and finally pointed out in the appended claims. It is to be understood that while the invention is primarily adapted for regeneratively amplifying more or less minute electrical currents, it is equally applicable for use wherever it is desired to convert light variations into electrical variations, as where it is desired to reproduce sound variations when recorded upon a motion picture film, to produce pictures by the process now known as "television", to calibrate the intensity of a light, or to compare the intensities or colors of two or more lights, and so on.

Figure 1:
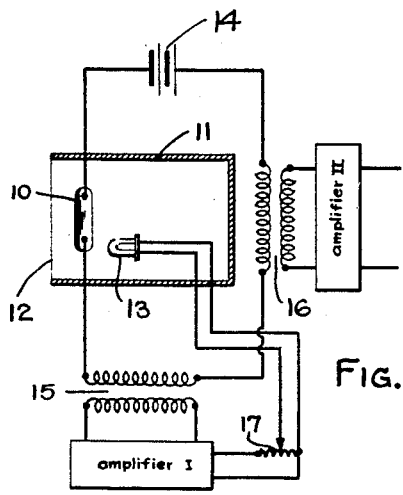
Figure 1 is a diagrammatic view of a regenerative amplifying circuit embodying the principles of the present invention and employing a single photo-electric cell.

Referring now to the drawing and more particularly to Figure 1 thereof wherein is shown the simplest arrangement embodying the principles of this invention, it will be observed that the photo-electric cell 10, which is subject to the influence of light rays emanating from a light source (not shown), is housed within a suitable opaque enclosure or casing 11. In the arrangement of Figure 1 the casing 11 is provided with an opening 12 facing the light source and it is within this opening 12 that the photo-electric cell is supported. It will be understood that the electrical resistance of the photo-electric cell is dependent upon the intensity of the light to which it is subjected.

Suitably mounted within the casing 11 are one or more neon tubes 13, these tubes being so arranged that the light emanating therefrom will be projected upon the side of the photo-electric cell 10 opposite that which is subject to the principal exterior light source (not shown). Connected in series relation with the photo-electric cell and the energizing source 14 therefor are the primary coils of transformers 15 and 16. Coupled to this primary photo-electric cell circuit, through the transformer 15, is an amplifying circuit I. Connected to the output of this amplifier I through a suitable potentiometer circuit 17 are the neon tubes 13. Also coupled to the primary photo-electric cell circuit, through the transformer 16, is a second amplifying circuit II, this latter circuit being independent of the amplifying circuit I.

The arrangement just described enormously increases the sensitiveness of the photo-electric cell in converting light variations into corresponding electrical variations, the explanation of the amplifying action being as follows. Variations in intensity of the light rays emanating from the principal light source (not shown) produce corresponding electrical variations in the primary photo-electrical cell circuit, the energy for the current in this circuit being supplied by the battery 14. Through the coupling effected by transformer 15, the amplifier I supplies energy to the neon tubes 13. Upon so energizing these neon tubes an auxiliary source of light variations is obtained for influencing the photo-electric cell 10, these auxiliary light variations being in synchronism with those produced by the principal light source. Due to the influence of the light thus produced by the neon tubes, the resistance of the photo-electric cell is decreased below its initial value in consequence of which larger variations of current are produced in the primary photo-electric cell circuit, thus still further reinforcing the oscillations produced in the amplifier I.

Simultaneously with this amplification in the amplifying circuit I a similar amplification takes place in the amplifying circuit II through the coupling effected by transformer 16. The potentiometer circuit 17 controls the oscillations produced in the amplifying circuit I and prevents over-saturation of the neon tubes 13, it being understood that the light emanating from these tubes is additive to the light emanating from the principal light source (not shown) in consequence of which the photo-electric cell 10 is so influenced that its resistance is reduced to an irreducible minimum. The result is an increased initial current flow in the primary photo-electric cell circuit and a greatly amplified output current from the amplifying circuit II, the variations of this output current being in accordance with the variations in the light emanating from the principal light source.

It will be seen that the arrangement as just described regeneratively amplifies the output of a photo-electric cell by feeding light back upon the cell, the fed-back light being produced by a portion of the energy established in the primary photo-electric cell circuit.

Figure 2:
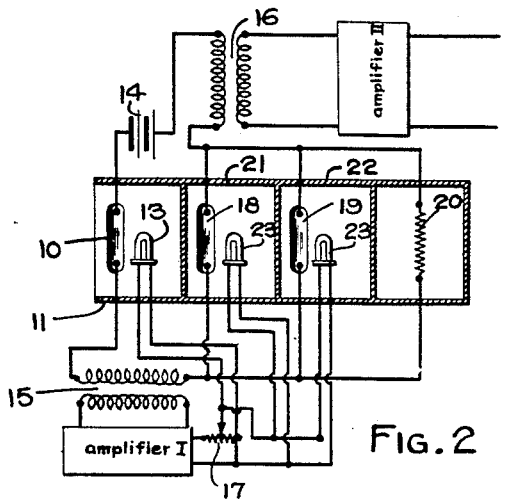
Figure 2 is a similar view employing a plurality of photo-electric cells connected in parallel.

Figure 2 is a modified arrangement of the circuit hereinbefore described. In this modified arrangement a plurality of secondary photo-electric cells 18 and 19 and a fixed resistance 20, all of which are connected in parallel, are included in the circuit of the primary photo-electric cell 10. The latter cell is exposed to the influence of light rays emanating from the principal light source (not shown) while the secondary cells 18 and 19 are completely enclosed within opaque chambers 21 and 22, respectively. The fixed resistance 20 is employed to complete the primary photo-electric cell circuit when the primary cell 10 is initially subjected to the principal light source.

Operatively associated with each of the secondary photo-electric cells 18 and 19 is a neon tube 23, the primary cell 10 being also provided with its neon tube 13 as in the arrangement of Figure 1. The neon tubes 10 and 23 are connected in parallel and are commonly controlled by the potentiometer circuit 17. Amplifiers I and II are employed as in the former instance, said amplifiers being respectively coupled to the primary cell circuit through the transformers 15 and 16.

The arrangement of Figure 2 operates in exactly the same manner as that of Figure 1, the sole difference being that the secondary cells 18 and 19, when influenced by their respective neon tubes 23, afford parallel paths through which the current flowing in the primary cell circuit may by-pass the fixed resistance 20. The result is a greater initial flow of current than that initially produced in the primary cell circuit of Figure 1.

Figure 3:
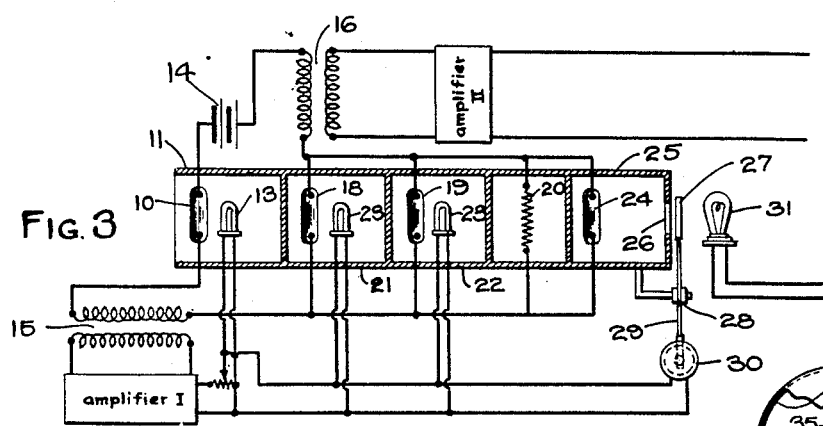
Figure 3 is a diagrammatic view of a regenerative amplifying circuit, wherein an auxiliary external light source is employed to influence a secondary photo-electric cell for further decreasing the resistance of the circuit.

Figure 3 is a still further modified arrangement for increasing the initial flow of current in the primary photo-electric cell circuit. In this arrangement an additional photo-electric cell 24 is connected in parallel with the secondary cells 18 and 19 and the fixed resistance 20, the cell 24 being enclosed within an opaque chamber 25 one wall of which is apertured, as at 26. Operatively associated with the apertured chamber 24 is a shutter or similar device 27, pivotally mounted, as at 28, this shutter being sufficient to cover the opening 26 when in the vertical position shown in Figure 3. It will be noted that the shutter 27 is supported upon the upper end of a rod 29 to the lower end of which is secured the armature or plunger of a solenoid 30. This solenoid 30 is connected across the output of the amplifying circuit I in parallel with the neon tubes 13 and 23—23. A source of light 31 is disposed to the rear of the apertured chamber 25 and in such position that the shutter 27 acts normally to intercept the rays of light emanating from said light source and directed toward the cell 24 through the aperture 26.

Simultaneously as the neon tubes 23—23 are energized to influence their respective cells 18 and 19, the solenoid 30 is energized with the result that the shutter 27 is actuated to an extent sufficient to uncover the aperture 26. Immediately that this aperture is uncovered, light rays from the source 31 will be projected into the interior of the chamber 25 and upon the photo-electric cell 24, thereby affording an additional current by-pass around the fixed resistance 20. The result is a still further decrease in the resistance of the primary photo-electric cell circuit thereby permitting a still greater flow of current through the primary coil of transformer 16. The current so produced is then amplified in the amplifying circuit II.

Figure 4:
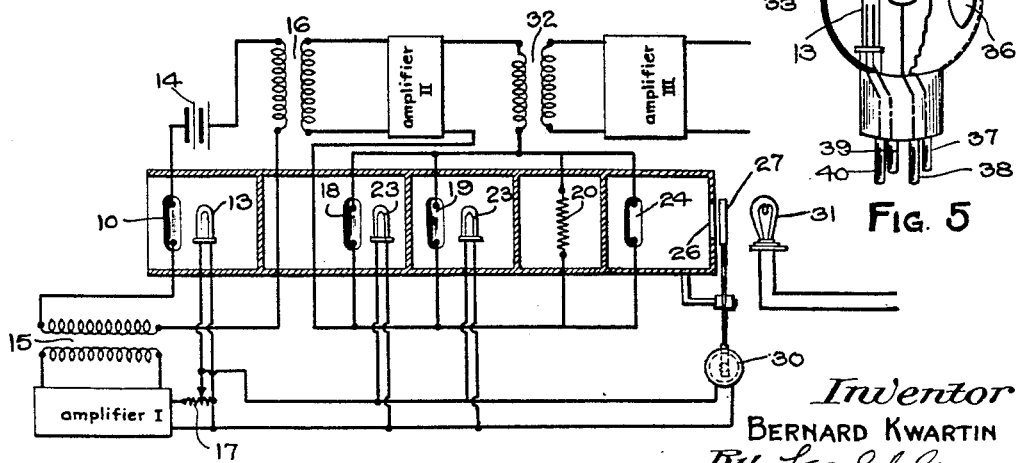
Figure 4 is a diagrammatic view of a regenerative amplifying system wherein the primary photo-electric cell circuit is independent of that which includes the secondary photo-electric cells.

In the arrangement shown in Figure 4, the primary photo-electric cell 10 is included in a circuit which is independent of that which includes the secondary photo-electric cells 18 and 19 and the fixed resistance 20. As in each of the former instances the amplifying circuit I is coupled to the primary photo-electric cell circuit through the transformer 15 and supplies energy to the several neon tubes 13 and 23—23, these tubes being respectively associated with the primary cell 10 and the secondary cells 18 and 19. If desired, the solenoid 30 may be employed for actuating the shutter 27 to permit light from the external source 31 to influence the auxiliary cell 24, the solenoid being also energized by the amplifying circuit I. The secondary cells 18 and 19, the fixed resistance 20 and the auxiliary cell 24, if the latter be employed, are connected in parallel with each other and are included in the amplifying circuit II, the latter circuit being coupled to the primary photo-electric cell circuit through the transformer 16. A third amplifying circuit III is coupled to the amplifier II through a transformer 32, the current oscillations produced in this final amplifying circuit being in accordance with the light-variations of the principal light source (not shown).

The operation of the arrangement shown in Figure 4 is as follows. The primary cell 10, when influenced by the light rays emanating from the principal light source, produces a varying current in the primary circuit which current is amplified in circuit I simultaneously as a portion thereof is induced in the circuit II, the current value in this latter circuit being limited by the fixed resistance 20. The amplifying circuit I, however, energizes the neon tubes 23—23 which in turn influence the secondary cells 18 and 19 to an extent sufficient to permit current to flow therethrough, thus shunting the resistance 20. The result is an increased current flow in the amplifying circuit II, the value of which may be still greater increased if the auxiliary cell 24 and its associated light source 31 are employed. The current thus established in circuit II is still further amplified by the amplifier III.

Figure 5:
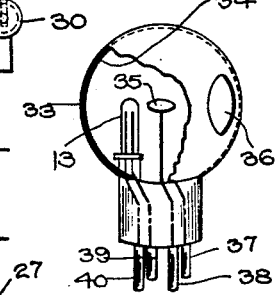
Figure 5 is a more or less diagrammatic view of a combined photo-electric cell and neon tube adapted for use in connection with the present invention.

Figure 5 illustrates more or less diagrammatically the manner in which the primary photo-electric cell 10 and the neon tube 13 operatively associated therewith may be combined in a single unit. In this combined unit the photo-electric cell 10 and the gaseous tube 13 are commonly housed within a globe 33 of glass or other suitable material the inner surface of which is preferably coated, as at 34, with potassium or an equivalent photo-electric material. This coating constitutes the cathode of the photo-electric cell, the anode thereof being formed by a grid 35 of platinum, tungsten or the like. The globe 33, which may be filled with a gas, such as argon, is provided with a transparent opening 36 through which the light rays from the principal light source may be projected upon the cathode in consequence of which electrons are emitted changing considerably the electric resistance between the electrodes 34 and 35. Upon energization of the neon tube 13, which latter is also housed within the globe 33, a further electronic emission is produced with the result that the resistance of the cell is still further decreased. It will, of course, be understood that the secondary photo-electric cell 18 and the neon tube 23 operatively associated therewith may be also contained within a single unit, the sole difference between this secondary unit and the primary unit being that in the former the transparent opening 36 is omitted. In each case the electrodes of the photo-electric cell are respectively provided with the terminals 37—38 while the electrodes of the gaseous element are provided with the terminals 39—40.

It will be understood, of course, that various changes and modifications of the invention may be made from time to time without departing from the spirit or principles of the invention as hereinbefore expressed, and it is accordingly intended to claim the invention broadly as well as specifically as indicated by the appended claims.

What is claimed as new and useful is:

1. In an apparatus for converting light variations into corresponding electrical variations, in combination, a primary photo-electric cell circuit including a photo-electric cell and a source of energy therefor, said cell being arranged to be influenced by fluctuating rays of light whereby to vary the resistance of said primary circuit in accordance with the intensities of the light rays, a secondary photo-electric cell also included in said primary circuit, and an auxiliary light source energized in accordance with the electrical current variations established in said primary circuit and operative to influence said secondary photo-electric cell whereby to still further decrease the resistance of said primary circuit, and means for delivering final amplified current variations corresponding to said fluctuating light rays, said auxiliary light source and said last mentioned means being each electrically coupled to said primary circuit.

2. In an apparatus for converting light variations into electrical variations, in combination, a primary photo-electric cell circuit including a primary photo-electric cell and a fixed resistance connected in series with a source of energy, said primary cell being arranged to be influenced by fluctuating direct or reflected rays of light emanating from a principal light source whereby to set up in said primary circuit initial current variations corresponding to said fluctuating light rays, at least one auxiliary photo-electric cell connected in parallel with respect to said fixed resistance, an auxiliary light source electrically coupled to said primary photo-electric cell circuit and operatively associated with each auxiliary photo-electric cell for influencing the same in accordance with the electrical variations established in said primary circuit whereby, when so influenced, each auxiliary photo-electric cell affords a path through which the current established in the primary circuit may by-pass said fixed resistance, and means for delivering final amplified current variations corresponding to said fluctuating light rays.

3. In an apparatus for converting light variations into electrical variations, in combination, a primary photo-electric cell circuit including a photo-electric cell and a source of energy therefor, said cell being adapted to be initially influenced by fluctuating rays of light emanating or reflected from a subject located in proximity therewith, an auxiliary light source adapted to further influence said photo-electric cell whereby to further decrease the resistance thereof, said auxiliary light source being energizable in accordance with the current variations established in said primary circuit, at least one additional photo-electric cell connected in parallel with said first-mentioned photo-electric cell, means operatively associated with each additional photo-electric cell for varying the respective resistances thereof in accordance with the variations in resistance of said first-mentioned photo-electric cell, and means for delivering final amplified current variations corresponding to said fluctuating light rays; said auxiliary light source, said means operatively associated with each additional photo-electric cell and said means for delivering final amplified current variations being each electrically coupled to said primary circuit.

BERNARD KWARTIN.